Nov. 27, 1951 J. S. KAMBORIAN 2,576,121
METHOD OF APPLYING FLEXIBLE COVERING MATERIAL
TO A RELATIVELY RIGID BACKING
Filed April 19, 1949 5 Sheets-Sheet 1
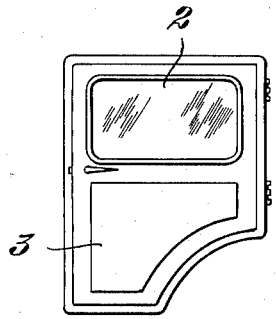
Fig.1
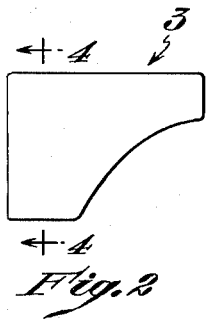
Fig.2
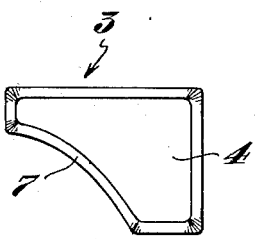
Fig.3
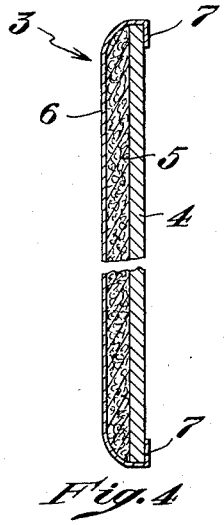
Fig.4
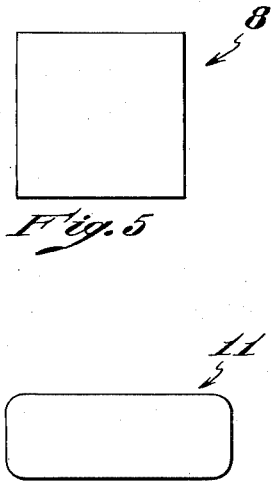
Fig.5
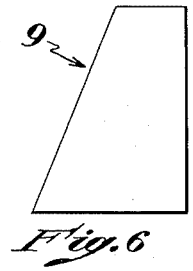
Fig.6
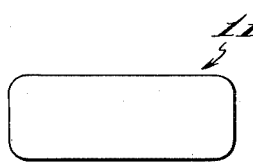
Fig.7
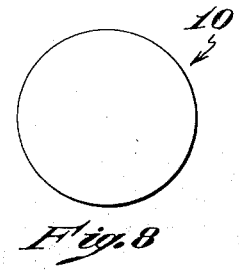
Fig.8
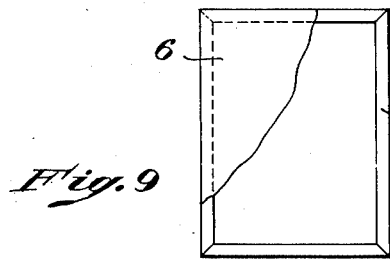
Fig.9
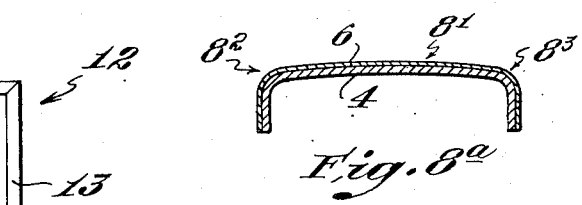
Fig.8ª
Inventor
Jacob S. Kamborian
by Roberts Cushman Grover
Att'ys Nov. 27, 1951        J. S. KAMBORIAN        2,576,121
METHOD OF APPLYING FLEXIBLE COVERING MATERIAL
TO A RELATIVELY RIGID BACKING
Filed April 19, 1949        5 Sheets-Sheet 2

Inventor
Jacob S. Kamborian
by Roberts Cushman Grover
Att'ys

Nov. 27, 1951         J. S. KAMBORIAN         2,576,121
METHOD OF APPLYING FLEXIBLE COVERING MATERIAL
TO A RELATIVELY RIGID BACKING
Filed April 19, 1949                                     5 Sheets-Sheet 3

Inventor
Jacob S. Kamborian
by Roberts Cushman Grover
Att'ys

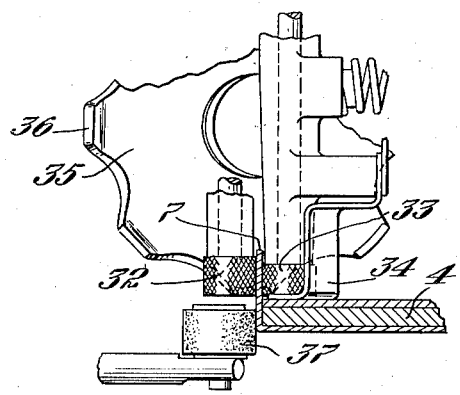
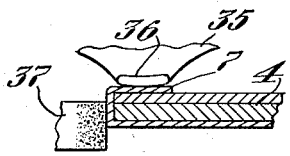
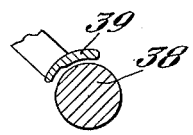
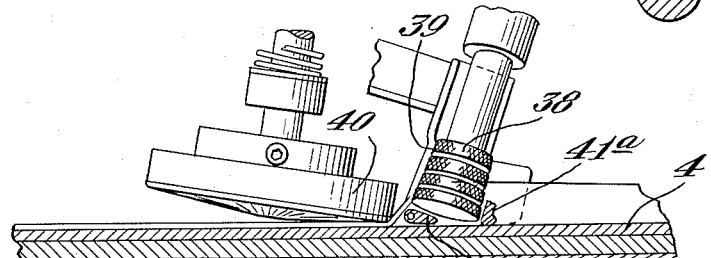
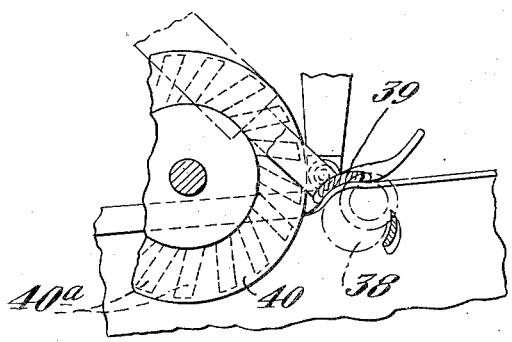

Nov. 27, 1951  J. S. KAMBORIAN  2,576,121
METHOD OF APPLYING FLEXIBLE COVERING MATERIAL
TO A RELATIVELY RIGID BACKING
Filed April 19, 1949

Inventor
Jacob S. Kamborian
by Roberts Cushman & Grover
att'ys

Patented Nov. 27, 1951

2,576,121

UNITED STATES PATENT OFFICE 2,576,121

METHOD OF APPLYING FLEXIBLE COVERING MATERIAL TO A RELATIVELY RIGID BACKING

Jacob S. Kamborian, West Newton, Mass.

Application April 19, 1949, Serial No. 88,402

9 Claims. (Cl. 154—41)

This invention relates to a novel method of applying padding and/or a covering or finish ply of pliable sheet material to one side of a relatively rigid backing or body member. Instances of the utility of this novel method are found in the preparation of panel-like parts, for instance, certain types of furniture seats or cushions; leather or cloth covered frames used in making suitcases, trunks, etc.; and the so-called "panels" used by the manufacturers of automobile bodies as an interior finish for the doors and portions of the sides and rear wall of the automobile body. These finish panels used in automobile bodies vary in shape and dimensions according to the design of the body in which they are used and the particular places at which they are to be applied, but substantially rectangular panels measuring thirty inches or more along each edge are not unusual. Each panel comprises a backing or body member of stiff sheet material, for example cardboard, indurated fiber, artificial wood, plywood or possibly sheet metal, usually, but not always, having a thin layer of padding at its inner or front side, and a ply of flexible fabric, for instance textile material, thin leather, sheeted synthetic plastic or the like (designed to provide a pleasing finish and usually ornamental appearance), which covers the padding and whose margins extend about the edge of the backing or body of the panel and are secured to the rear surface of the body, for example by means of metallic fasteners or preferably adhesive. To insure the desired effect, the textile or other finishing ply is stretched tightly over the padding (or directly across the inner or front side of the backing or body if no padding is used) and the margins are secured in place to the rear or underside of the body without relinquishing the tension applied in stretching the material. Heretofore the application of this finishing ply has been a purely manual operation, the worker applying the requisite stretching stress by hand while turning the margin in over the back of the body portion and then pressing it down into adhesive contact by means of a hand tool or by the use of the thumbs or fingers. Since the panels may be of substantial size, as above noted, the margin which must thus be turned in and cemented by hand may exceed one hundred and fifty inches for a given panel. Not only is the application of the finish ply by hand slow and expensive, but by manual means it is not practicable to obtain uniformity of stretch. Customarily the operator stretches the finish ply at one point and secures it in place, then moves along some distance and stretches another portion of the fabric and attaches it and so on around the entire periphery of the panel. At those points at which he seizes the material and applies stress the fabric is stretched to a maximum, while at intervening portions the material is subjected to a lesser degree of stretch. Thus, there is a tendency to produce an uneven undulant surface. Moreover, the stress applied by different operators tends to differ, and even the same operator may stress the material differently when first starting work in the morning and when he has become tired toward the end of the day.

One object of the present invention is to provide a novel method of preparing panels such as automobile panels more expeditiously and with more uniform results than by prior methods. A further object is to provide a novel method of applying a thin, flexible finishing ply to a substantially flat, stiff backing whereby the finishing ply is stressed substantially uniformly throughout its entire area and its margins are secured in place with substantial uniformity along its periphery. A further object is to provide a novel method of preparing automobile body panels wherein the stretching stress used in tensioning the finishing ply progresses along any given edge of the panel, and wherein the marginal portion of the finish ply is turned in and adhesively united to the outer surface of the body portion progressively and concomitantly with the application of stretching stress. A further object is to provide a method of stretching and attaching the covering ply so that its attached margin is smooth and substantially level. A further object is to provide a novel method which involves the application of stress to the covering ply, first in a plane which is approximately perpendicular to the rear face of the backing, and then in a direction substantially parallel to the rear face of the backing. A further object is to provide a method in which the covering ply is progressively stretched from point to point along the edge of the backing with a concomitant wiping-in action which also progresses from point to point along the edge of the backing. Other and further objects and advantages of the invention (for convenience, but without limiting intent, herein described with particular reference to the preparation of automobile panels) will be pointed out in the following more detailed description and by reference to the accompanying drawings wherein:

Fig. 1 is a diagrammatic elevation of the inside of the door of a passenger automobile;

Fig. 2 is an elevation of the inner or front side of the finish panel of the door of Fig. 1;

Fig. 3 is a similar elevation showing the outer or rear side of the panel, that is to say, the side which is opposed to the metal forming the door proper;

Fig. 4 is a fragmentary section, to larger scale, on the line 4—4 of Fig. 2;

Figs. 5, 6, 7 and 8 are elevations illustrative of panels of different shapes which may be prepared in accordance with the present invention;

Figure 10:
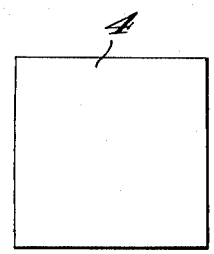
Figure 11:
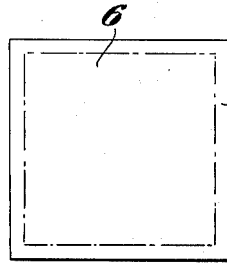
Figure 12:
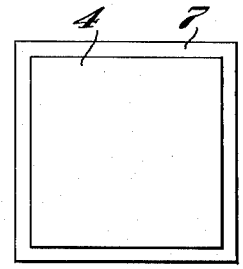
Figure 13:
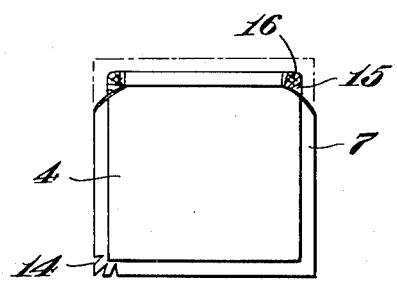
Figure 14:
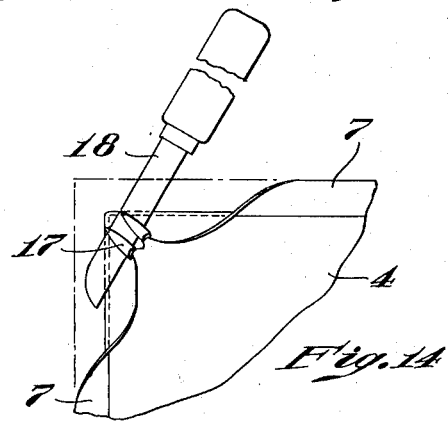
Figure 15:
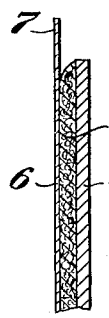
Figure 16:
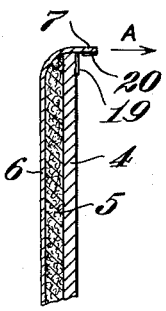
Figure 17:
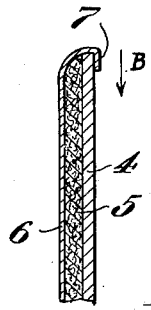
Figure 18:
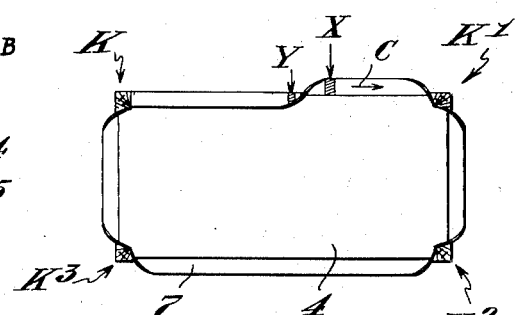
Figure 19:
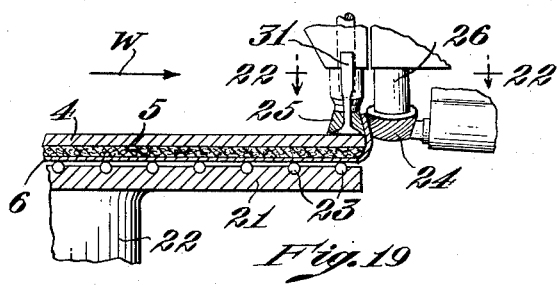
Figure 20:
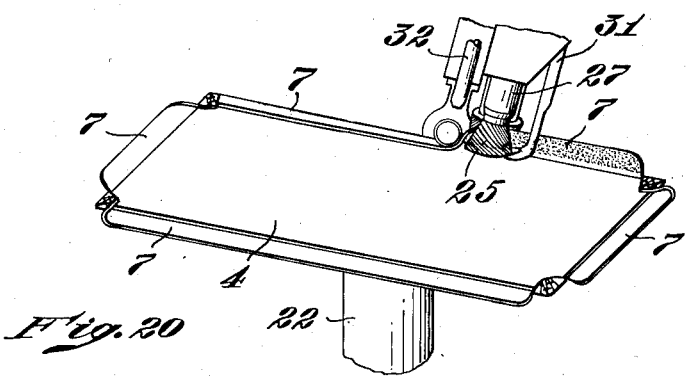
Figure 21:
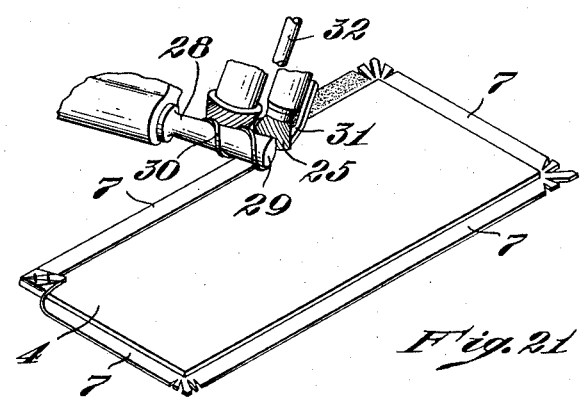
Figure 22:
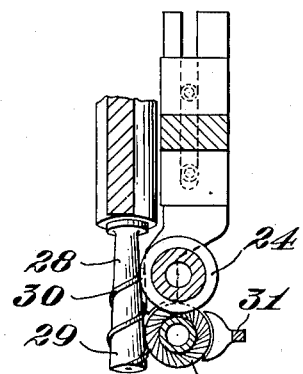
Figure 23:
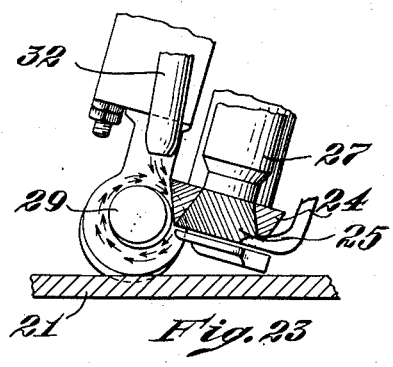
Figure 29:
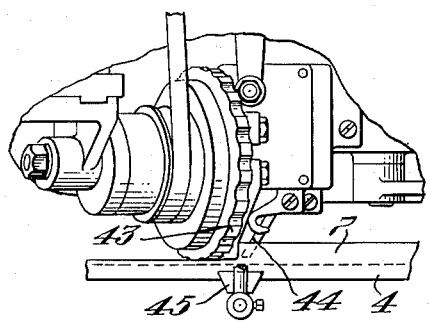
Figure 30:
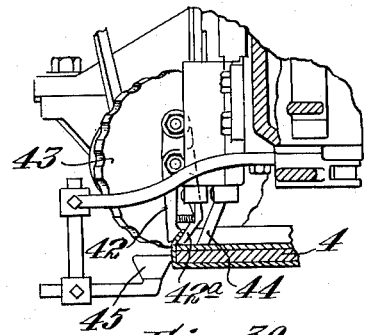
Figure 31:
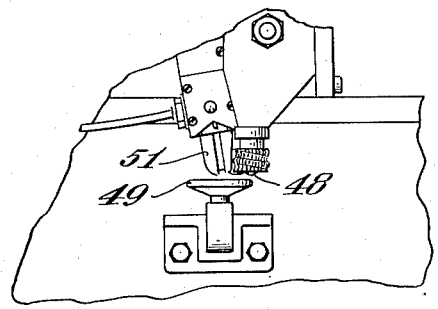
Figure 32:
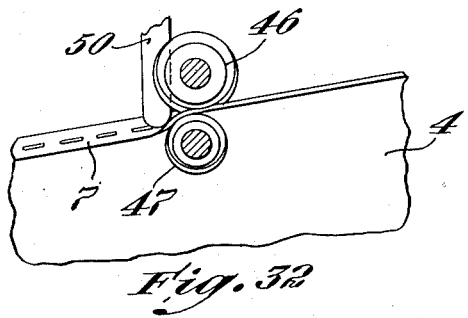

Fig. 8ᵃ is a transverse section, illustrating a panel which is bent substantially to U-shape;

Fig. 9 is an elevation with parts broken away showing a panel of different internal construction;

Fig. 10 is an elevation illustrating the stiff backing member of a rectangular panel such as that shown in Fig. 5;

Fig. 11 is an elevation of the covering employed with the backing of Fig. 10;

Fig. 12 is a plan view illustrating the manner in which the backing of Fig. 10 and the covering of Fig. 11 are first assembled;

Fig. 13 illustrates preferred early steps in the method of the present application;

Fig. 14 is a diagrammatic plan view, to larger scale than Fig. 13, showing one corner of the panel and illustrating an optional step in the process;

Figs. 15, 16 and 17 are fragmentary sections, generally similar to Fig. 4, illustrating successive steps in the assembly of the parts of the panel;

Fig. 18 is a diagrammatic plan view illustrating the procedure in accordance with the present invention whereby the covering material is stretched and wiped in over the rear surface of the backing;

Fig. 19 is a fragmentary vertical section, partly in elevation, diagrammatically illustrating mechanical means useful in carrying out the operation illustrated in Fig. 18;

Fig. 20 is a perspective view showing the operation of Fig. 18 as performed by the use of the mechanical means of Fig. 19;

Fig. 21 is a view similar to Fig. 20 but showing the operation from a different angle;

Fig. 22 is a fragmentary section substantially on the line 22—22 of Fig. 19 omitting the work support and the panel;

Fig. 23 is a fragmentary elevation, partly in vertical section, looking in the direction of the arrow W of Fig. 19 but omitting the panel;

Fig. 24 is a fragmentary side elevation showing apparatus of specifically different type useful in the practice of the invention;

Fig. 25 is a fragmentary view similar to Fig. 24 but illustrating the in-wiping action;

Fig. 26 is a fragmentary front elevation illustrating another type of mechanism useful in the practice of the invention;

Fig. 27 is a fragmentary horizontal section in a plane perpendicular to the axis of the wiper disk shown in Fig. 26;

Fig. 28 is a fragmentary section in a plane perpendicular to the axis of the gripper roll of Fig. 26;

Fig. 29 is a fragmentary side elevation illustrating a further form of mechanism which may be employed;

Fig. 30 is a fragmentary front elevation of the mechanism shown in Fig. 29;

Fig. 31 is a fragmentary side elevation illustrative of means whereby, as a step in the method, the margin of the covering is secured to the backing by metallic fasteners; and Fig. 32 is a fragmentary section in a plane perpendicular to the axis of the gripper roll of Fig. 31.

Referring to the drawings, the numeral 1 (Fig. 1) indicates the door of a passenger automobile viewed from inside. This door is of a conventional type having a rigid frame and an outer covering of metal and having the window 2 in its upper part and the ornamental finish panel 3 at its lower part. As illustrated, the contour of this panel is such as to conform more or less to the contour of that portion of the door in which it is installed. These ornamental panels, used in the doors of automobiles and also to form portions of the side and rear walls of the automobile interior, usually consist of a backing of stiff sheet material with a covering, exposed at the inside of the car, of textile, leather or other flexible material appropriate for exposure at the inside of the car. Frequently, although not universally, a thin layer of padding is interposed between the backing and the covering in order to give the effect of upholstery and a pleasing feeling of softness to the touch. As illustrated in Fig. 4, the backing member 4 carries the padding 5 at its front or inner face, this padding being enclosed between the backing member 4 and the covering fabric 6, the margins 7 of which extend about the edges of the backing 4 and are secured to the outer or rear surface of the backing 4, usually being secured by an adhesive although staples are sometimes employed. Heretofore the assembly of the backing, padding and covering has usually been carried out wholly by hand, the operator placing the materials in proper relative position and then stretching the covering and drawing its margin over the backing 4 and sticking it down. In accordance with the present invention, the work is greatly speeded up as compared with the hand operation and more uniform results are obtained.

Referring to Figs. 10 to 14, the backing 4 is provided as usual and the cover 6 of suitable material is also provided, this cover being of sufficiently greater area than the backing to provide the attaching margin 7. Conveniently, the cover is placed upon a horizontal support, the padding is placed upon the cover or, if preferred, is attached adhesively or otherwise to the undersurface of the backing, and the backing is then placed on the covering, as illustrated in Fig. 12, so that the margin 7 extends beyond the edges of the backing at all points. Usually the projecting margin initially lies in a plane substantially parallel to the planes of the front and rear faces of the backing. Preferably before stretching and turning in the margins of the cover, the cover and backing are attached to each other at several spaced places so that they will not relatively shift during the stretching operation. For example, readily removable tacks may be driven through the covering, preferably near or within the margin and into the backing, these tacks being removed at the completion of the operation. However, it is preferable to attach the cover to the backing by turning the corner portions of the margin inwardly over the corners of the backing and securing them permanently, as by adhesive or staples, to the backing. If the corners of the panel are sharp, or if the covering material is stiff or bulky, it may be necessary, in order to avoid the formation of thick and unsightly wrinkles where the corners of the cover are turned inwardly over the rear surface of the backing, to slash the corner portions of the cover, as shown at 14 (Fig. 13), before turning them in. The corners, whether slashed or not, are then turned in by hand and secured in place, as shown at 15 (Fig. 13), either by adhesive or by staples 16 (Fig. 13), the latter being of a type which do not extend through the entire thickness of the backing. Instead of slashing the corner of the cover before turning it in over the corners of the backing, the corners may be turned in and adhesively secured in place, with the concomitant formation of unavoidable plaits or wrinkles. This surplus material (if sufficiently bulky to warrant the work of removing it) may be trimmed off smoothly, for example, by means of a knife blade 18 (Fig. 14) which is moved in a plane close to and substantially parallel to the rear surface of the backing 4. If the covering is a soft, easily stretchable material, or when the covers are rounded, as shown in Fig. 7, the wrinkles or plaits which are formed may be wholly inconsequential.

Having thus attached the covering to the backing at the four corners of the latter, the margins 7 of the covering are now turned in between these places of attachment and secured to the backing. According to the present invention the procedure in so doing is diagrammatically illustrated in Fig. 18. Thus, for example, starting at the corner K, a narrow area X of the margin of the covering, which adjacent to the corner is initially upstanding (due to the fact that at the corner the margin has been turned in and laid down flat), is seized and subjected to a stress such as to draw the covering transversely across the front face of the panel and snugly down against the padding. Ordinarily it is not required to stretch the covering any more than is sufficient to remove wrinkles and to hold the padding in place so that it will not sag during use and to obtain this degree of stress it is sufficient if the margin 7 of the covering be pulled in a direction substantially as illustrated by the arrow A in Fig. 16, that is to say, that it be pulled in a plane which is substantially perpendicular to the plane of the rear surface of the backing member 4.

As soon as this stress has been established over the narrow area X (which initially is very close to the corner K), the point of application of stress is caused to progress along the edge of the backing in the direction of the arrow C toward the corner $K^1$, that is to say, the area X which receives the immediate stress advances along the edge uninterruptedly until it reaches the corner $K^1$. As the width of the area X does not increase, this means that the stretching stress is released from the area to which it was first applied while concomitantly a new area receives the stress. Furthermore, as fast as the stress is released from a given area, the area which has just been released, indicated by the character Y (Fig. 18), is subjected to an in-wiping stress or impelling force which carries it inwardly in the direction of the arrow B, Fig. 17, across the edge of the backing member 4 so that it overlaps the rear surface of the backing member 4 to which it is then secured, for example by adhesive or by staples. Preparatory to this operation, the marginal portion of the backing may be provided with a coating 19 (Fig. 16) of adhesive or the inner surface of the margin 7 may be provided with a coating 20 of adhesive or both of such coatings may be provided, the coatings of adhesive being of such character that when the margin 7 is turned in against the rear surface of backing 4, the margin is adhesively and permanently united to the backing. Thermoplastic type of adhesive may be employed, if desired, with the application of heat at the proper instant in the operation to insure adhesion.

After the margin has been turned in and secured between the points K and $K^1$, it is preferable to start next at the corner $K^2$ and proceed to the corner $K^3$ and then subsequently in a similar way to turn in the margins between the corners $K^3$ and K and between the corners $K^1$ and $K^2$. However, the operation may proceed from one corner to the next adjacent corner all of the way around if preferred.

If the corners of the panel are rounded on large arcs, as illustrated in Fig. 7, or if the periphery of the panel be curved throughout, as shown in Fig. 8, the operation of stretching the covering and turning in and securing its margin may begin at any point and progress uninterruptedly around the entire periphery until the starting point is reached.

While, as above described, it is usually desirable, when the panel has sharp corners, to fold in and attach the covering material at the corners before commencing the machine operation, this is not absolutely necessary since a skilled operator can do one side of the panel and then the adjacent side without first folding in the corner. It is also possible, though difficult, for a skilled operator to proceed along one side to the corner and then to cause the machine to pause while he turns the panel in readiness to proceed along the adjacent side, without releasing the grip on the covering while turning the corner.

This progressive stretching and turning or wiping-in the margin may be carried out in various ways and by the use of hand-actuated implements and by mechanisms of various types. One mechanical means appropriate for the purpose is illustrated in Figs. 19 to 23. In these views there is shown a work support or table 21 carried by a pedestal 22, or other convenient support, the table 21 having a substantially horizontal upper surface for supporting the panel during the several operations. As illustrated in Fig. 19, the upper surface of the support is provided with freely rotatable ball bearings 23 to facilitate turning the work on the table, although, if the table have a smooth and preferably polished surface, such ball bearings or equivalent antifriction means are not necessary. Likewise, the table itself may be mounted to rotate freely on the pedestal 22 thus facilitating the presentation of the work to the stretching and wiping-in instrumentalities.

As illustrated in Fig. 19, the stretching means comprises a pair of oppositely rotating rolls 24 and 25 mounted on shafts 26 and 27, respectively. Preferably, although not necessarily, the axes of these shafts lie in a plane which is inclined to the surface of the table 21, as illustrated in Fig. 23. Preferably the shafts 26 and 27 are relatively movable bodily toward and from each other to facilitate the entry of the work between the rolls, although such relative movement of the rolls is not necessary. If they are so relatively movable, spring means may be employed to urge them toward each other thereby to provide a firm grip of the work between them. These rolls are constantly rotated in opposite directions by power means or by hand, as desired. These rolls, in cooperation with other parts, create the desired stretching stress above referred to.

For wiping the marginal material of the covering inwardly over and for laying it down against the rear surface of the panel as it is released by the stressing means, there is provided a wiping device, here shown as a shaft 28, having a tapering wiper body 29 at its end, the wiper body being provided with a helical rib 30. The axis of the shaft 28 is in a plane substantially parallel to the plane defined by the axes of the shafts 26 and 27, the axis of the shaft 28 being slightly inclined to the horizontal so that the work-contacting element of the wiper member 29 is substantially parallel to the upper surface of the table 21. The relative arrangement of the parts 24, 25 and 29 in the horizontal plane is illustrated in Fig. 22. Preferably a work hold-down 31 is associated with the rolls 24 and 25, this hold-down 31 bearing against the upper surface of the backing member 4 at the working point so as to oppose the upward stress exerted by the rolls. If thermoplastic adhesive is to be used, a nozzle 32 may be provided designed to deliver a jet of hot air or inflammable gas in the neighborhood of the member 29 so as to keep the latter hot and thereby activate the thermoplastic adhesive. Alternatively, the nozzle may deliver a fluid, hot thermoplastic adhesive for uniting the parts, thus making it unnecessary to apply adhesive as a preliminary to the covering operation.

Assuming that the apparatus just above described is to be used in carrying out the operation illustrated in Fig. 18, the upstanding margin of the cover, adjacent to the corner K, would first be inserted between the rolls 24 and 25, the rolls gripping this margin with a firm grip. Assuming that the rolls are rotating in the proper direction, they immediately begin to move the margin with the backing member 4 along so that the point at which the margin is gripped by the rolls moves relatively in the direction of the arrow C (Fig. 18). As the material escapes from between the rolls (as the gripped point thus advances), the wiper member 29, which is rotated in the proper direction according to the pitch of the helix 30, engages the material escaping from between the rolls and impels it inwardly across the edge of the backing 4 and lays it down into firm adhesive contact with the upper surface of the backing. The operation thus proceeds uninterruptedly and without at any time releasing the margin from the grip of the rolls until the rolls have reached the corner K¹. The margin is allowed to run out from between the rolls at this point and the rolls are then engaged with the upstanding margin either at the corner K¹ or at one of the other remaining corners, and the margin is stretched and wiped-in in the interval between that and the next following corner and so on.

This operation, as it is carried out between any pair of adjacent corners, is extremely rapid as compared with the hand operation; it results in applying uniform stress to every point along the margin since the stressing area proceeds by infinitesimal amounts along the edge of the backing, and the degree of stress is the same at every point along the margin and is the same for all panels no matter how many may be prepared in a given period of time. The method is not confined to the covering of flat panels, but is usually applicable to the covering of panels which are curved or angular in section. Thus Fig. 8ᵃ illustrates a panel 8¹, which has panels at 8² and 8³. Such a panel may be covered by the same method and with substantially the same facility as those above described.

While apparatus such as shown in Figs. 19 to 23 is useful in the performance of the method herein described and claimed, it is possible to carry out the method by different means or appliances. For example, referring to Figs. 24 and 25, a mechanism may be employed comprising a pair of substantially cylindrical rolls 32 and 33 mounted to turn on parallel axes, one or both of the rolls being power driven. As in the previously described arrangement, provision may be made for bodily separating the rolls to admit the marginal material 7 between them. Desirably, the axes of the rolls are inclined in the direction of travel of the work in the same way as is illustrated in Fig. 23. In this arrangement, that surface of the panel 4 to which the margin of the covering is to be secured is engaged by a stationary hold-down device 34 and the work may be guided by means of an edge gauge roll 37. The hold-down device may be provided with a delivery orifice and constitute a nozzle for delivering adhesive into the angle between the margin 7 and the upper face of the backing 4.

As the marginal material is gripped by the rolls 32 and 33 and subjected to stretching stress to draw it about the backing 4, that portion of the margin which is escaping from between the rolls is engaged, before it can retract, by a rotary wiper 35, of more or less disk form, having segmental wiping elements 36 (Fig. 25) spaced along its edge which engage the marginal material and which wipe it and press it down firmly into engagement with the surface of the member 4, as illustrated in Fig. 25. In this arrangement, as in that previously described, the rolls 32 and 33 concomitantly apply stretching stress and feed the work along relative to the field of action of the wiper device.

In Figs. 26 to 28 another arrangement is illustrated wherein the means for gripping the margin and for applying stretching stress to the margin consists of a single rotating roll 38 and a cooperating fixed member 39, the latter preferably having a concave surface opposed to the periphery of the roll 38, said surface being smoothly polished. In this instance, the stressed marginal material 7 of the covering, as it escapes from between the parts 38 and 39, is engaged by a rotary wiper 40, of disk type, turning about a substantially vertical axis and, if desired, having work-engaging ribs 40ᵃ on its undersurface, which wipe the margin down onto the upper surface of the part 4. As illustrated in Fig. 26, a member 41 engages the upper surface of the part 4 at approximately the point at which the marginal material 7 is escaping from between the parts 38 and 39. This member 41 has a nozzle opening through which adhesive may be delivered into the angle between the upstanding marginal material 7 and the upper surface of the backing 4, just before the margin is engaged by the wiper 40. A hold-down device 41ᵃ may be provided and so located as to engage the upper surface of the backing 4 to resist the upward stress applied by the roll 38 and the concave member 39. As illustrated (Fig. 26), the axis of the roll 38 is inclined in the direction of advance of the work and the roll is of frusto-conical shape, tapering upwardly.

In Figs. 29 and 30 a still further mechanism is illustrated which may be used in the practice of the process. In this device, as contrasted with those previously described, the stretching stress is applied to the margin of the covering by a pair of opposed separable nipper jaws 42 and 42ᵃ. These nipper jaws are actuated by appropriate means so as first to grip the marginal material of the covering, then to move relatively to the backing 4 to apply stress to stretch the covering, then, while still gripping the margin, to move in a direction such as to feed the work (the covering and backing) along toward the field of action of the in-wiping means, then releasing their grip on the work and returning to the starting point and seizing a fresh portion of the margin, and repeating the cycle with great rapidity. As the margin is released by the jaws at the end of the first feeding motion and before the covering can retract, it is engaged by a rotary wiper 43 which wipes the margin down onto the upper surface of the backing 4. A suitable hold-down 44 engages the upper surface of the part 4 to oppose the upward stress applied by the nipper jaws, and an edge gauge 45 may be provided for guiding the work as it is moved along.

Useful results may also be obtained, even though the nipper jaws 42 and 42ª do not have any work feeding motion but merely seize the margin and apply stretching stress to move it into the field of action of a device which, as the jaws open, presses the margin down onto the backing and while so pressing it, exerts a feeding action such as to position a fresh portion of the margin in position to be gripped by the nipper jaws.

In Figs. 31 and 32 an arrangement is illustrated whereby, as a final step in the operation, the margin of the covering material is secured to the backing by metallic fasteners, for example staples. In this arrangement, helically ribbed rolls 46 and 47 (corresponding in function and mode of operation to the rolls 24 and 25 above described) seize the margin 7 and apply the stretching stress while feeding the work along. A button 48 at the lower face of the roll 47 contacts the upper surface of the backing 4 and constitutes an abutment to resist upward movement of the backing in response to the stretching stress exerted by the rolls. A work guide or gauge 49 assists the operator in guiding the work during its movement. A wiper element 50, for example a rapidly reciprocating blade, wipes the margin inwardly over the surface of the backing 4 as the margin is progressively released from between the rolls.

A guide 51 is arranged to deliver metallic fasteners, such as staples, supplied from any suitable source, the guide having associated with it a driver element of a type conventional in staple driving mechanism, operative to drive the staples through the margin and into the backing 4 immediately after the margin has been wiped in by the wiper 50.

Obviously, other mechanical means or implements may likewise be used in the practice of the invention, which is not dependent upon any particular mechanism, but which contemplates the application of stretching force to the marginal material of the covering, the in-wiping and/or pressing down of this marginal material at the instant stress is being released and before the covering material can retract, and the attachment of the wiped-in material to the backing—all as a rapidly repeated cycle wherein the final step of one cycle is incomplete when the next cycle commences, and capable of being carried out at high speed and with the production of substantially uniform results.

While the work-supporting table 21, or its equivalent, is desirable to relieve the operator of the work of supporting the panel, it is not necessary, particularly if the panels be of relatively small size. However, for making panels of the sizes commonly used for automatic interior finish, such a support or equivalent means is found to be desirable. Likewise, it is contemplated that conveyor means may be provided for supplying the panels to the operator who is to perform the operation illustrated in Fig. 18, and that the preliminary steps of assembly and attaching the covering at spaced intervals to the backing may be carried out at other places and the partially assembled panels delivered by conveyor to the operator at the table 21.

While panels having a solid imperforate backing, such as the sheet material 4, are customary, the present invention is also applicable to the covering of open panels, for instance chair seat pads, or the like, such as that shown in Fig. 9 wherein the rigid part of the backing consists merely of an open frame 13. Moreover, while the operation is particularly useful for preparing panels such as above described, the term "panel" as here employed is to be considered as of more general application and it is contemplated that the method herein disclosed may be found useful in the application of padding and/or covering fabrics to a rigid backing to form parts or panels for other purposes, for instance padded chair seats.

While, as above noted, mechanically-driven appliances are useful in carrying out the steps of the process, all of the moving parts illustrated in Figs. 19 to 23 may be driven by hand, if desired, or the operation may be carried out by other hand-actuated implements.

Desirable steps in the method have herein been described by way of illustration, but it is to be understood that the exact sequence of steps described is not essential to the practice of the invention; that certain steps may be dispensed with without detracting from the value of the other steps and that all equivalents with respect to specific procedural steps and to means for carrying them out are to be regarded as falling within the scope of the appended claims.

Reference is hereby made to applicant's copending application Serial No. 88,401, filed April 19, 1949, and to applicant's Patent No. 2,467,385, dated April 19, 1949.

I claim:

1. That method of preparing interior finish panels for automobile bodies which comprises as steps providing a stiff, substantially flat sheet of backing material of the proper shape and dimensions, providing a flexible covering sheet, relatively thinner than the backing and of a shape substantially like that of the backing but of a size such that if the backing be placed on the covering sheet in symmetrical relation to the latter the marginal portion of the covering sheet will project beyond the edge of the backing substantially the same amount at all points, applying a layer of padding to the front face of the backing, so applying the covering sheet to the exposed surface of the padding layer that the margins of the covering sheet, which extend beyond the edge of the backing, lie in a plane substantially parallel to the rear surface of the backing, gripping a narrow area of the margin of the sheet and applying pull tending to stretch the covering material about the padding and over the edge of the backing and, without ceasing to apply said pull, causing the point of application of pull to progress uninterruptedly along the edge of the backing, wiping the margin inwardly over the rear face of the backing just to the rear of the instant point of application of pull, and adhesively securing the wiped-in portion of the margin to the rear face of the backing.

2. That method of preparing interior finish panels for automobile bodies which comprises as steps providing a stiff flat backing of polygonal shape and of the proper dimensions, providing a flexible covering of sheet material, relatively thinner than the backing and of a shape substantially like that of the backing but of a size such that if the backing be placed upon the covering in symmetrical relation to the latter the marginal portion of the covering will project beyond each edge of the backing, so assembling the covering and backing that the margin of the covering, extending beyond each edge of the backing, lies in a plane substantially parallel to the rear face of the backing, first drawing the corner portions of the margin about the corners of the backing and securing said corner portions of the margin to the rear surface of the backing, thereafter seizing a narrow area of the margin, adjacent to a selected corner of the backing, and exerting pull thereon in a plane substantially perpendicular to the face of the backing and, without intermitting said pull, progressing the point of application of the pull uninterruptedly along the edge of the backing, wiping in the marginal material just to the rear of the instant point of application of pull and attaching the wiped-in margin to the rear surface of the backing, and, after thus completing the stretching and attaching of the margin along one edge of the backing, similarly stretching and attaching the margin along each of the other edges.

3. That method of preparing a covered panel which comprises as steps providing a flat backing of stiff sheet material of substantially rectangular contour and of the proper dimensions, providing a flexible covering of sheet material relatively thinner than the backing and of a shape substantially like that of the backing but of a size such that if the backing be placed upon the covering in symmetrical relation to the latter the marginal portion of the covering will project beyond each edge of the backing, so assembling the covering and backing that the margin of the covering, extending beyond each edge of the backing, lies in a plane substantially parallel to the rear surface of the backing, turning each corner of the covering inwardly and over the rear surface of the backing, adhesively securing each turned-in corner of the covering to the backing, trimming off surplus material resulting from the plating of the covering resultant from turning it in at the corners, seizing a narrow area of the margin adjacent to any selected corner and exerting pull thereon in a direction such as to stretch the covering over the backing, progressively displacing the direction of pull uninterruptedly along the edge of the backing and, as the point of application of pull advances, wiping the stretched marginal material inwardly over the rear face of the backing and attaching it thereto, and after the point of application of pull has thus progressed to the next corner, similarly stretching and attaching the margin in the intervals between the other corners.

4. That method of preparing covered panels which comprises as steps providing a flat, stiff backing of uniform thickness and of the proper shape and dimensions, providing a flexible covering of sheet material relatively thinner than the backing and of a shape substantially like that of the backing but of a size such that if the backing be placed upon the covering in symmetrical relation to the latter, the marginal portion of the covering will project beyond the edge of the backing at all points, placing the covering upon a horizontal support, placing a layer of padding approximating the size and shape of the backing upon the covering, laying the backing upon the padding, the exposed margin of the covering lying flat upon the support, seizing the margin, successively at widely spaced points along its periphery, and at each such point drawing the upper upwardly and inwardly over the exposed upper face of the backing, securing the covering to the backing at each of said points, thereafter causing gripping means, including a constantly rotating roll, to engage the margin at a point adjacent to a selected one of the places of attachment and to exert pull upon the covering in a direction to stretch it about the edge of the backing, moving the backing relatively to the gripping means so that the point of application of pull moves uninterruptedly along the edge of the backing, the gripping means progressively engaging new portions of the margin of the covering while concomitantly releasing portions which have been gripped but without at any time wholly releasing the margin, progressively wiping the margin inwardly over the rear surface of the backing and securing it to the backing as fast as it is released by the gripping means and, after so stretching and securing the margin between adjacent places of initial attachment, similarly stretching and attaching the margin between the other places of attachment.

5. That method of preparing padded panels which comprises as steps providing a stiff backing of substantially uniform thickness and of the proper shape and dimensions, providing a flat, flexible covering of sheet material relatively thinner than the backing and substantially like the backing but of a size such that if the backing be placed upon the covering in symmetrical relation to the latter the marginal portion of the covering will project beyond each edge of the backing, applying padding to the front face of the backing, so assembling the covering and backing that the padding is interposed between the backing and covering and with the margin of the covering projecting beyond the edge of the backing and in a plane substantially parallel to the plane of the rear face of the backing; seizing the projecting margin at a predetermined point and drawing it up about the edge of the backing and attaching it to the rear face of the backing, gripping the projecting margin, adjacent to said point of attachment, between a pair of constantly rotating rolls while applying stress to the margin in a direction such as to stretch the covering snugly over the padding and about the edge of the backing, so moving the backing that the point at which the margin is gripped by the rolls moves uninterruptedly longitudinally of the edge of the backing whereby the rolls progressively engage new portions of the margin while concomitantly releasing portions of the margin which have previously been gripped but without at any time wholly releasing the margin, progressively wiping said portions of the margin as they are released by the rolls inwardly against the rear surface of the backing, and securing the wiped-in portions of the margin to rear face of the backing.

6. That method of preparing padded panels which comprises as steps providing a stiff backing of substantially uniform thickness and of the proper shape and dimensions, providing a flat, flexible covering of sheet material, relatively thinner than the backing and of a shape substantially like that of the backing but of a size such that if the backing be placed upon the covering in symmetrical relation to the latter the marginal portion of the covering will project beyond the edge of the backing at all points, providing a layer of padding, so assembling the covering and backing that the padding is interposed between the covering and the front face of the backing, with the margin of the covering projecting beyond the edge of the backing and in a plane substantially parallel to the plane of the rear face of the backing, seizing the projecting margin at each of predetermined widely spaced points, and at each of said points, drawing the margin about the edge of the backing and attaching it to the rear face of the backing, seizing a narrow area of the projecting margin of the covering adjacent to each of said points of attachment, in succession, and stressing it in a direction such as to stretch it snugly over the padding and about the edge of the backing, and wiping the marginal material, which has been so stressed, inwardly over the rear face of the backing and securing it to the latter, the point at which such stress is applied being advanced without interruption and by infinitesimal amounts along the edge of the backing to the next point of attachment.

7. That method of preparing padded panels which comprises as a step providing a stiff, flat backing of substantially uniform thickness and of the proper shape and dimensions, providing a flexible covering sheet, relatively thinner than the backing and of a shape substantially like that of the backing, but of a size such that if the backing be placed upon the covering sheet, in symmetrical relation to the latter, the marginal portion of the covering sheet will project beyond each edge of the backing, applying thermoplastic adhesive to the rear face of the backing along its margins, placing the covering sheet upon a horizontal support capable of rotation about a vertical axis, placing a layer of padding of approximately the same size and shape as the backing upon the covering sheet, laying the backing upon the padding so that its front face contacts the padding and so that the backing is in symmetrical relation to the covering sheet, the exposed margins of the covering sheet being substantially parallel to the upper surface of the support, causing gripping means, including a constant rotating roll, to seize a narrow area of the margin of the covering sheet and to hold it while stress is applied in a direction such as to draw the covering material snugly about the layer of padding, and about the edge of the backing, turning the support while shifting the backing relatively to the gripping means so that the place of engagement of the margin of the covering sheet with the gripping means progressively advances along the edge of the backing, the gripping means seizing fresh areas of the margin of the covering sheet while concomitantly releasing areas previously gripped, causing the thermoplastic adhesive on the backing to become tacky, applying to that area of the margin, which at any given time is being released from the gripping means, in-wiping thrust directed transversely across the edge of the backing by means of a rotating helical wiper element, uninterruptedly rotating the wiping element always in a direction to urge the marginal material of the covering sheet inwardly across the edge of the backing so as to wipe the marginal material of the covering sheet against the tacky adhesive on the rear surface of the backing, and shifting the place of application of said in-wiping thust uninterruptedly along the edge of the backing so as progressively to wipe in fresh areas of the marginal material of the covering sheet while keeping the place of engagement of the wiping element with the margin always substantially the same distance from the place of application of stretching stress.

8. That method of preparing interior finish panels for automobile bodies which comprises as steps providing a stiff, substantially flat sheet of backing material of the proper shape and dimensions, providing a flexible covering sheet relatively thinner than the backing and of a shape substantially like that of the backing, but of a size such that if the backing be placed on the covering sheet in symmetrical relation to the latter the marginal portion of the covering sheet will project beyond the edge of the backing substantially the same amount at all points, so assembling the covering sheet with the backing that the margins of the covering sheet, which extend beyond the edge of the backing, lie substantially in the plane of the front surface of the backing, gripping a narrow area of the projecting margin of the sheet and applying pull in a direction such as to tension and stretch the covering material and to dispose the tensioned portion of the margin substantially perpendicular to the plane of the front face of the backing, wiping the tensioned marginal material inwardly over the rear face of the backing adjacent to the instant point of application of pull, and adhesively securing the wiped-in portion of the margin to the rear face of the backing, and, as each such area of the margin is wiped in, gripping and pulling an adjacent portion of the margin, and so progressing along the periphery of the backing until all of the margin has been stretched, wiped in and secured.

9. That method of preparing covered panels which comprises as steps providing a flat, stiff backing of uniform thickness and of the proper shape and dimensions, providing a substantially flat, flexible covering of sheet material relatively thinner than the backing and of a shape substantially like that of the backing, but of a size such that if the backing be placed on the covering in symmetrical relation to the latter the marginal portion of the covering will project beyond the edge of the backing at all points, arranging the backing above the covering so that the margin of the covering projects beyond the edge of the backing at all points, gripping a narrow area of the projecting margin and applying stress thereto so directed that the tensioned portion of the margin is drawn about the edge of the backing and carried inwardly over the rear face of the backing and down onto the rear face of the backing, and securing said portion to the backing, and as each such narrow area of the margin is being secured to the backing, gripping and tensioning an adjacent portion of the margin, and so progressing, cycle after cycle, along the periphery of the backing, the final step in each cycle being incomplete when the next cycle commences, until substantially all of the margin has been tensioned and drawn about the edge of the backing and secured to the rear face of the backing.

JACOB S. KAMBORIAN.

REFERENCES CITED

The following references are of record in the file of this patent:

UNITED STATES PATENTS

| Number | Name | Date |
|---|---|---|
| 1,387,312 | Regenstein | Aug. 9, 1921 |
| 2,099,989 | Osborn | Nov. 23, 1937 |
| 2,251,284 | Kamborian | Aug. 5, 1941 |